United States Patent
Eom et al.

(10) Patent No.: US 8,819,790 B2
(45) Date of Patent: Aug. 26, 2014

(54) COOPERATION METHOD AND SYSTEM BETWEEN SEND MECHANISM AND IPSEC PROTOCOL IN IPV6 ENVIRONMENT

(75) Inventors: Young-Ik Eom, Gyeonggi-do (KR); Kwang-Sun Ko, Seoul (KR); Hyun-Su Jang, Gyeonggi-do (KR); Hyun-jin Cho, Seoul (KR); Yong-Woo Jung, Seoul (KR); Hyun-Woo Choi, Gyeonggi-do (KR); Gye-Hyeon Gyeong, Gyeonggi-do (KR); Jung-Hwan Choi, Seoul (KR); Zhen Zhao, Gyeonggi-do (KR); Tae-Hyoung Kim, Gyeonggi-do (KR); Youn-Woo Kim, Gyeonggi-do (KR)

(73) Assignee: Sungkyunkwan University Foundation for Corporate Collaboration, Gyeonggi-Do (KR)

(*) Notice: Subject to any disclaimer, the term of this patent is extended or adjusted under 35 U.S.C. 154(b) by 1202 days.

(21) Appl. No.: 12/040,355

(22) Filed: Feb. 29, 2008

(65) Prior Publication Data
US 2009/0077642 A1 Mar. 19, 2009

(30) Foreign Application Priority Data
Sep. 14, 2007 (KR) .................. 10-2007-0093807

(51) Int. Cl.
*H04L 9/32* (2006.01)
*G06F 21/00* (2013.01)
*H04L 29/06* (2006.01)

(52) U.S. Cl.
CPC .................. *H04L 63/164* (2013.01)
USPC ....................... 726/6; 726/4; 726/8

(58) Field of Classification Search
USPC ........................................ 726/4–8
See application file for complete search history.

(56) References Cited

U.S. PATENT DOCUMENTS

2002/0152384 A1* 10/2002 Shelest et al. ............. 713/176
2002/0157024 A1* 10/2002 Yokote .................... 713/201

(Continued)

FOREIGN PATENT DOCUMENTS

KR 10-2006-0125372 12/2006

OTHER PUBLICATIONS

J. Arkko et al. "RFC 3971: SEcure Neighbor Discovery (SEND)" © 2005 The Internet Society (56 pages) http://tools.ietf.org/pdf/rfc3971.pdf.*

(Continued)

*Primary Examiner* — Darren B Schwartz
*Assistant Examiner* — Thomas Gyorfi
(74) *Attorney, Agent, or Firm* — James P. Muraff; Neal, Gerber & Eisenberg LLP

(57) ABSTRACT

The present invention relates to a method of embodying a cooperation system between SEND and IPSec in an IPv6 environment. The cooperation system between SEND and IPSec in accordance with the present invention includes: receiving an authentication completion report message including a first IP address of a host whose authentication is completed by the SEND; generating new authentication information corresponding to the host and storing the new authentication information in a temporary storage area, if authentication information for the host is not present in the temporary storage area, wherein the authentication information includes the first IP address; and if an authentication check request message including a second IP address is received from the IPSec, checking whether the second IP address is present in the temporary storage area, and sending the result of checking to the IPSec. The present invention allows the authentication information shared between SEND and IPSec in a mobile environment, where the network is frequently accessed, enabling IPSec secure communication at a lower cost.

12 Claims, 9 Drawing Sheets

(56) References Cited

U.S. PATENT DOCUMENTS

| | | | |
|---|---|---|---|
| 2003/0046585 A1 | 3/2003 | Minnick | |
| 2004/0240669 A1* | 12/2004 | Kempf et al. | 380/277 |
| 2005/0165953 A1* | 7/2005 | Oba et al. | 709/238 |
| 2006/0005014 A1* | 1/2006 | Aura et al. | 713/162 |
| 2006/0020807 A1* | 1/2006 | Aura et al. | 713/176 |
| 2006/0274693 A1* | 12/2006 | Nikander et al. | 370/331 |
| 2007/0256120 A1* | 11/2007 | Shatzkamer et al. | 726/5 |
| 2008/0089290 A1* | 4/2008 | Coulas et al. | 370/331 |
| 2008/0198805 A1* | 8/2008 | Weniger et al. | 370/331 |
| 2008/0307516 A1* | 12/2008 | Levy-Abegnoli et al. | 726/9 |
| 2009/0201855 A1* | 8/2009 | Weniger et al. | 370/328 |
| 2009/0327721 A1* | 12/2009 | Arkko et al. | 713/168 |

OTHER PUBLICATIONS

T. Narten et al. "RFC 2461: Neighbor Discovery for IP Version 6 (IPv6)" © 1998 The Internet Society (93 pages) http://tools.ietf.org/pdf/rfc3971.pdf.*

Wikipedia reference for "IPSec" as published on Feb. 27, 2007 (7 pages) http://en.wikipedia.org/w/index.php?title=IPsec&oldid=111309161.*

S. Kent et al. "RFC 2401: Security Architecture for the Internet Protocol" © 1998 The Internet Society (66 pages) http://tools.ietf.org/pdf/rfc2401.pdf.*

S. Kent et al. "RFC 2402: IP Authentication Header" © 1998 The Internet Society (22 pages) http://tools.ietf.org/pdf/rfc2402.pdf.*

S. Kent et al. "RFC 2406: IP Encapsulating Security Payload" © 1998 The Internet Society (22 pages) http://tools.ietf.org/pdf/rfc2406.pdf.*

Jari Arkko et al. "Securing IPv6 Neighbor and Router Discovery" © 2002 ACM (published Sep. 28, 2002) (10 pages).*

Office Action dated Aug. 20, 2009 for Korean Patent Application No. 10-2007-0093807.

'Design of a Cooperation Scheme between the SEND mechanism and the IPSec protocol in IPv6 Environments' (Jun. 22, 2007) (Partial Translation).

* cited by examiner

COOPERATION METHOD AND SYSTEM BETWEEN SEND MECHANISM AND IPSEC PROTOCOL IN IPV6 ENVIRONMENT

CROSS-REFERENCE TO RELATED PATENT APPLICATIONS

This application claims the benefit of Korean Patent Application No. 10-2007-0093807, filed on Sep. 14, 2007, in the Korean Intellectual Property Office, the disclosure of which is incorporated herein in its entirety by reference.

BACKGROUND OF THE INVENTION

1. Field of the Invention

The present invention relates to a method of security and authentication in a mobile environment, more specifically to a method of security and authentication in an IPv6 environment that is capable of providing a more powerful and efficient authentication process by building a cooperation system between a SEND protocol and an IPSec protocol in a mobile IPv6 environment.

The present invention provides a method of security and authentication that is capable of performing a cost-efficient IPSec secured communication by sharing authentication information between the SEND protocol and IPSec protocol in a mobile environment, which has frequent entry and exit.

2. Background Art

The traditional mechanism of the Internet, to which hosts fixed to a wire network, has been recently evolving to link the wire network and wireless network and to support a mobile node that performs communication between the networks.

Mobile IP is a protocol developed to support the mobility of such terminals.

Particularly, the Mobile IPv6 technology works transparently with a higher protocol of the IP layer, and provides the mobility of an IPv6 host by maintaining active TCP connection and UDP port binding flawlessly.

The 3GPP ($3^{rd}$ Generation Partnership Project) and the 3GPP2, which are the two most important standard organization of modern mobile communication, adopted Mobile IPv6 as the standard for mobile Internet environment.

This is because the Mobile IPv6 technology can provide secure information protection, which is the biggest shortcoming of the mobile communication, enable efficient networks of various electronic devices by securing ample address space, support an automatic plug & play networking, and provide an efficient networking method through an optimized routing path configuration.

The IPv6 protocol includes an IP Security (IPSec) protocol as its basic security mechanism for the security of IP communication. In addition, for the security of a Neighbor Discovery (ND) protocol, which is used for entering the network, discovering a router, and discovering another neighboring host, the IPv6 protocol has defined a Secure ND (SEND) protocol.

The major problem to be addressed with respect to Mobile IPv6 is currently focused on security issues, and accordingly many problems have been solved.

However, when the two security mechanisms, namely, the IPSec protocol and the SEND protocol, are used at the same time, the authentication has been redundantly made for an identical host.

Moreover, the SEND protocol can periodically replace the IP address used for security, and thus an environment that communicates by use of the SEND protocol has to re-negotiate security whenever the address is changed, if an old IPSec is still used.

SUMMARY OF THE INVENTION

Contrived to solve the above problems, the present invention provides a method and system for user authentication in a mobile internet environment that is capable of sharing authentication information, generated by the SEND protocol, with the IPSec protocol in the IPv6 environment that uses both the SEND and IPSec and recognizing the opposite host by using an open key in IPSec.

The present invention also provides a faster and more efficient authentication method and system by eliminating unnecessary authentication procedure, thanks to cooperation of SEND and IPSec in a mobile internet environment.

The present invention also provides a cooperation system between hosts in a network environment in which a host applied with the cooperation method between SEND and IPSec and a host unapplied with the cooperation method coexist.

An aspect of the present invention features a method of cooperation between SEND and IPSec in an IPv6 environment.

The method of cooperation between SEND and IPSec in an IPv6 environment in accordance with an embodiment of the present invention can include: receiving an authentication completion report message including a first IP address of a host whose authentication is completed by the SEND; generating new authentication information corresponding to the host and storing the new authentication information in a temporary storage area, if authentication information for the host is not present in the temporary storage area, wherein the authentication information includes the first IP address; and if an authentication check request message including a second IP address is received from the IPSec, checking whether the second IP address is present in the temporary storage area, and sending the result of checking to the IPSec.

Another aspect of the present invention features a cooperation system between SEND and IPSec in an IPv6 environment.

The system of cooperation between SEND and IPSec in an IPv6 environment in accordance with an embodiment of the present invention can include: an authentication cache, temporarily storing authentication information of a host whose authentication is completed; a SEND block, performing user authentication for an opposite host and sending an IP address of the authenticated opposite host to an authentication cache management module; an authentication cache management module, if an IP address of an authenticated host is received from the SEND block, storing the IP address in the authentication cache or checking for authentication of the IP address by referring to the authentication cache in accordance with an authentication check request from an IPSec block; and an IPSec block, sending an authentication check request message including an IP address of a host to be authenticated to the authentication cache management module and determining whether the pertinent host is authenticated in accordance with a result of authentication check received from the authentication cache management module.

BRIEF DESCRIPTION OF THE DRAWINGS

These and other features, aspects and advantages of the present invention will become better understood with regard to the following description, appended Claims and accompanying drawings where:

DESCRIPTION OF CERTAIN INVENTIVE EMBODIMENTS

Figure 1:
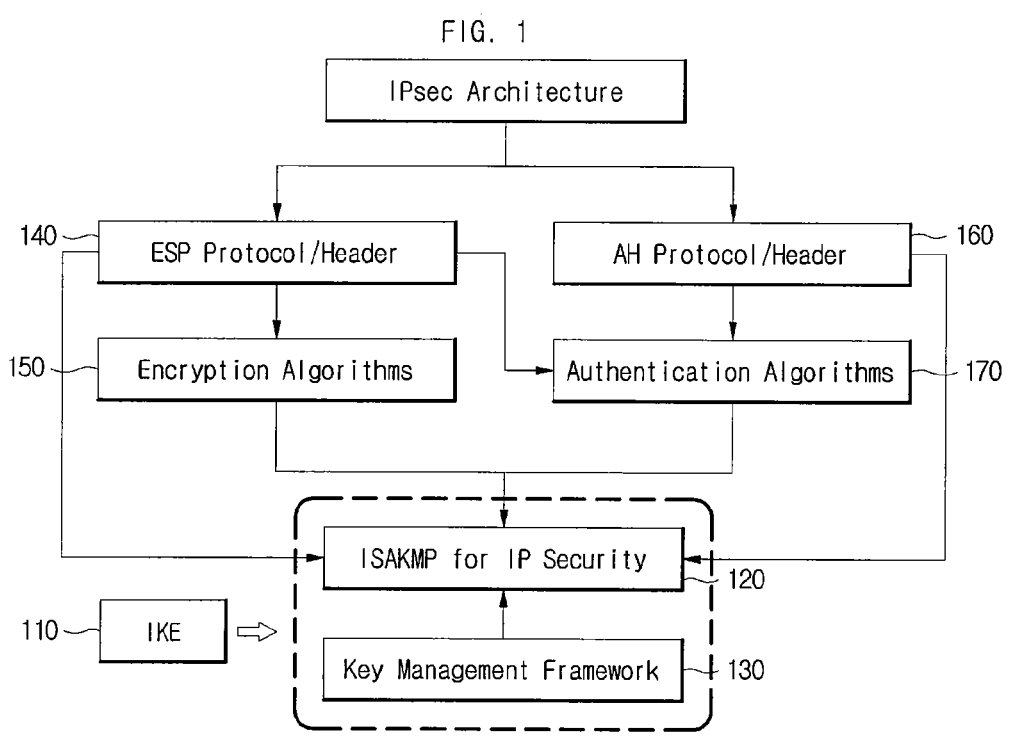
FIG. 1 shows a block diagram of a typical IPSec structure.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention.

Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present invention. The term "and/or" shall include the combination of a plurality of listed items or any of the plurality of listed items.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Hereinafter, some embodiments will be described in detail with reference to the accompanying drawings. Identical or corresponding elements will be given the same reference numerals, regardless of the figure number, and any redundant description of the identical or corresponding elements will not be repeated. Throughout the description of the present invention, when describing a certain technology is determined to evade the point of the present invention, the pertinent detailed description will be omitted.

Prior to describing the present invention, the SEND (Secure Neighbor Discovery) protocol and IPSec (Internet Protocol Security) protocol, used for security in the IPv6 protocol, which is the technical basis of the present invention, will be briefly described. In addition, the problems that can occur when the two protocols are simultaneously used will be described. That is, the problems that can occur in a cooperation environment of SEND and IPSec will be described.

IPSec is a security protocol that provides confidentiality and integrity of IP address and data between an IP layer and transmission layer and enables secure communication between hosts.

The security services generally provided by IPSec include access control, confidentiality, connectionless integrity, anti-replay service, data origin authentication, and limited flow confidentiality.

The hosts requiring IPSec secure communication configures a key exchange and security negotiation through an Internet Key Exchange (IKE).

FIG. 1 is a block diagram showing a typical IPSec structure.

As shown in FIG. 1, an IKE consists of an ISAKMP, which configures key distribution and security agreement. User authentication is first performed for both sides when the key is distributed, and then the key is normally distributed only if the user authentication is successful.

Here, the key can include a security key, encryption key, and authentication key.

Then, the security agreement can be encrypted and sent to a corresponding host, and confidentiality and integrity of transmitted can be provided between hosts once the agreement is successful.

The SEND protocol has been developed to support the security function to the ND protocol, and can protect an ND message by itself even in an environment that does not have a security infrastructure such as IPSec.

Figure 2:
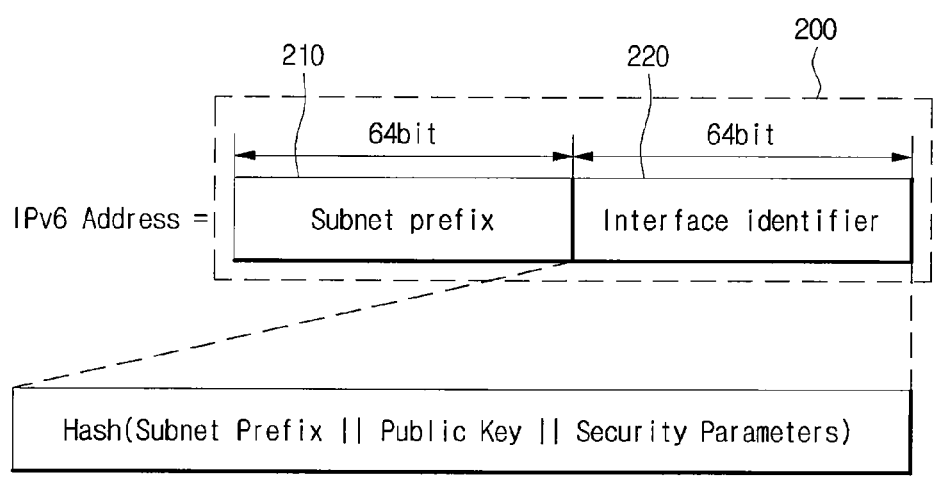
FIG. 2 shows an IP address system in IPv6 in accordance with an embodiment of the present invention.

FIG. 2 illustrates an IP address system in Ipv6 in accordance with an embodiment of the present invention.

The host using SEND has to be pre-assigned with a pair of public key and private key and maintain the pair in a storage area. Here, the assigned public key is used to have an IP address generated by a cryptographically generated address (CGA) security module, as shown in FIG. 2.

Referring to FIG. 2, an IP address 200 used in an Ipv6 environment has a total size of 128 bits, and includes a Subnet Prefix 210 and an Interface Identifier 220, each of which has a length of 64 bits.

Here, the Interface Identifier 220 can be generated using the Subnet Prefix 210, the public key and security parameters.

Then, by sending data (e.g. the Subnet Prefix 210 and Interface Identifier 220) for verifying the address, an electronic signature for the data, and the public key together to the opposite host, a host can authenticate the host that generated the address and verify the ownership for the address.

Hereinafter, the process of performing communication in a network environment to which SEND is applied will be described.

Basically, it is imperative that the IP address be converted to a physical layer address at the start of a TCP/IP communication. This function is equally required in the Ipv6 environment, and an address resolution function of the ND mechanism handles this function.

In case IPSec is performed in an environment to which SEND is applied, the IKE sends an IPSec connection request message, with the IP address of a host that will perform the IPSec secure communication as the destination.

In general, if a message received from an application hierarchy is delivered to an IP layer, the IP address is configured in a message header, and if the message is delivered from the IP layer to a physical layer, a physical address is configured for the IP address.

The physical address of the opposite host can be obtained through an address resolution protocol.

The address resolution in IPv6 is performed using an ND message, and communication is performed using SEND for the protection of the ND message.

The host that received the ND message to which SEND is applied authenticates the ownership of the address of the host that sent the message. If the ownership is authenticated successfully, the address resolution is terminated normally. Then, the communication between the two hosts can be normally carried out.

Next, IPSec performs IPSec communication by using the IKE to distribute a key, which includes a symmetrical key as a secret key to be used in IPSec secret communication, and carry out a security agreement.

In the above process, however, each of the SEND and IPSec carries out a separate authentication process for the same host. The redundant authentication for the same host results in the following process cost, as shown in Table 1, between the SEND process and IPSec configuration.

TABLE 1

Process cost required when both SEND and IPSec are used

| | Process Cost |
|---|---|
| SEND | $2C_{Hash} + 2C_{Sig}$ |
| IPsec | $2C_{DH} + 2C_{SK} + C_{Sig}$ |
| When both are carried out | $2C_{Hash} + 3C_{Sig} + 2C_{DH} + 2C_{SK}$ |

*$C_{Hash}$: Hash function process cost
*$C_{SK}$: Symmetrical key password process cost
*$C_{Sig}$: Electronic signature process cost
*$C_{DH}$: Key distribution process cost As shown in the above Table 1, the cost required for processing SEND can be defined as a sum of two times of the hash function process cost ($2C_{Hash}$) and two times of the electronic signature process cost ($2C_{Sig}$).

On the other hand, the cost required for processing IPSec can be defined as a sum of two times of the key distribution process cost ($2C_{DH}$), two time of the symmetrical key password process cost ($2C_{SK}$), and two times of the electronic signature process cost ($2C_{Sig}$).

The electronic signature process cost ($C_{Sig}$) is required for both the SEND process and IPSec process. In other words, it can be inferred that the electronic signature process cost ($C_{Sig}$) is redundant in the SEND and IPSec cooperation system.

In the IPv6 environment, the address can be changed quite frequently due to the movement or security reasons. Therefore, unlike the IPv4 environment, which uses static addresses, it is projected that the IPv6 environment will increasingly use addresses that are automatically assigned through automatic address configuration rather than fixed addresses.

Therefore, if the end-host recognition method using an IP address that has been conventionally used in the IPv4 environment is used as is, the IPSec protocol used in the IPv6 environment has to carry out not only an inefficient operation of engaging in a new session but also a subsequent authentication process.

Hereinafter, a method of cooperation between SEND and IPSec will be described.

Figure 3:
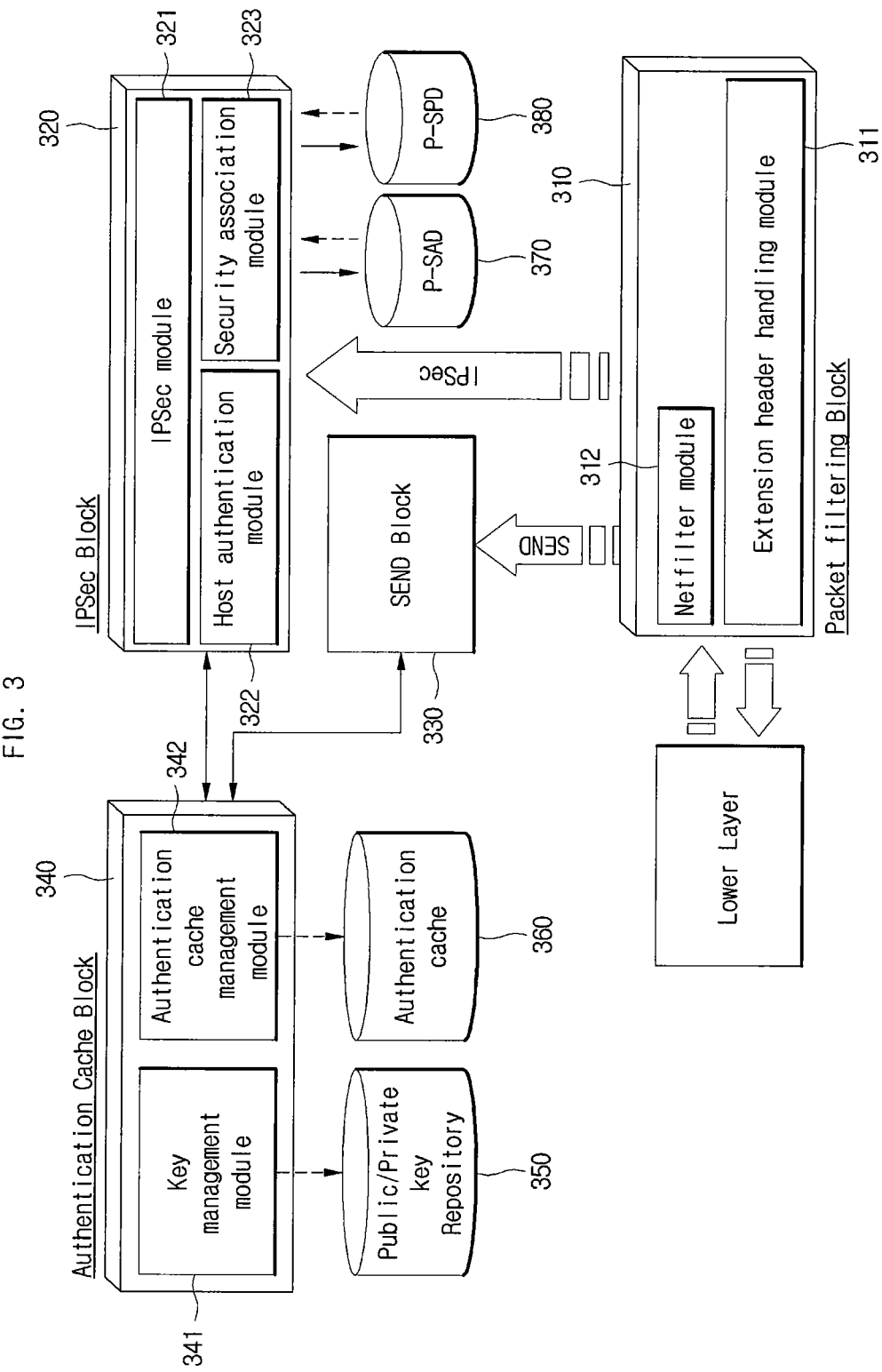
FIG. 3 shows a system structure for cooperation between SEND and IPSec in accordance with an embodiment of the present invention.

FIG. 3 is a system structure for cooperation of SEND and IPSec in accordance with an embodiment of the present invention.

More specifically, FIG. 3 illustrates a system structure for solving the problem of redundant authentication process, which can occur in the conventional SEND and IPSec cooperation environment. In FIG. 3, authentication information is shared between SEND and IPSec, and IPSec is capable of recognizing the opposite host by use of a public key.

Generally, the host to which SEND is applied in the IPv6 environment has the public key/private key. Using this property, it is possible to have the user information shared between the two technologies, and through this sharing, the process speed of IPSec can be improved.

As shown in FIG. 3, the cooperation system in accordance with an embodiment of the present invention can include a packet filtering block 310, an IPSec block 320, a SEND block 330, an authentication cache block 340, a public/private key repository 350, an authentication cache 360, a public key security agreement database (P-SAD) 370, and a public key security policy database (P-SPD) 380.

The packet filtering block 310 can include an extension header handling module 311 and a packet filter module 312.

Here, the extension header handling module 311 can analyze an extension header of a received packet and deliver the received packet to a corresponding block or module. That is, the extension header handling module 311 can function as a packet router.

For example, as a result of analyzing the extension header, the extension header handling module 311 can send a packet related to IPSec to the IPSec block 320, and a packet related to a SEND or ND message to the packet filter module 312.

The packet filter module 312 filters the ND message among an input packet and an output packet.

The IPSec block 320 can include an IPSec module 321, which handles IPSec for the input/output packet, a host authentication module 322, which handles security negotiation between hosts as well as user authentication using authentication cache, and a session management module 323, which manages a session corrects session information.

The SEND block 330 handles SEND process for an input/output ND packet, and delivers IP address information assigned to an authenticated host to an authentication cache management module 342. It is preferable that the communication between the SEND block 330 and the authentication cache management module 342 be made using a shared memory.

Referring to FIG. 3, the authentication cache block 320 can include the authentication cache management module 342 and a key management module 341.

If the user authentication for the ND packet is successful, the authentication cache management module 342 stores the authentication information in an authentication cache, and manages the authentication cache by referring to the status of a neighbor cache.

For example, the authentication cache management module 342 stores IP address information received from the SEND block 330 in the authentication cache. It is preferable that the IP address information is stored in a format of linked list.

In case a control signal, including an IP address, is received from the IPSec block 320 for an authentication check of a host, the authentication cache management module 342 can determine whether the IP address exists in the authentication cache 360, and provide the determination result to the IPSec block 320 by using a control signal.

That is, the authentication cache management module 342 determines that the authentication check has been successful if the received IP address exists in the authentication cache 360. On the other hand, the authentication cache management module 342 determines that the authentication check has failed if the received IP address does not exist in the authentication cache 360.

The key management module 341 generates a public key and a private key and stores them in the public/private key repository 350. It is preferable that the information on the public key and private key for each user is stored in a form of a file in the public/private key repository 350.

The authentication cache is a temporary repository of the user authentication information and can be managed by the authentication cache management module 342.

The public/private key repository 350 is a recording medium in which the public key and private to be used in SEND and IPSec are stored, and is managed by the key management module 341.

The P-SAD 370 is a database that stores the public key assigned to each host together with a conventional security agreement database, and the PSPD 380 is a database that stores the public key assigned to each host together with a conventional security policy database.

Compared to the conventional system, the SEND and IPSec cooperation system of the present invention can incorporate the authentication cache 360, the authentication cache management module 342, the key management module 341, and the public/private key repository 350, and some handling process of SEND and IPSec can be modified.

The authentication cache 360 of the present invention can have a structure that can store the IPv6 address, and can be created and managed by the authentication cache management module 342.

Hereinafter, a process flow of the authentication cache management module 342 will be described in detail with reference to FIG. 4.

Figure 4:
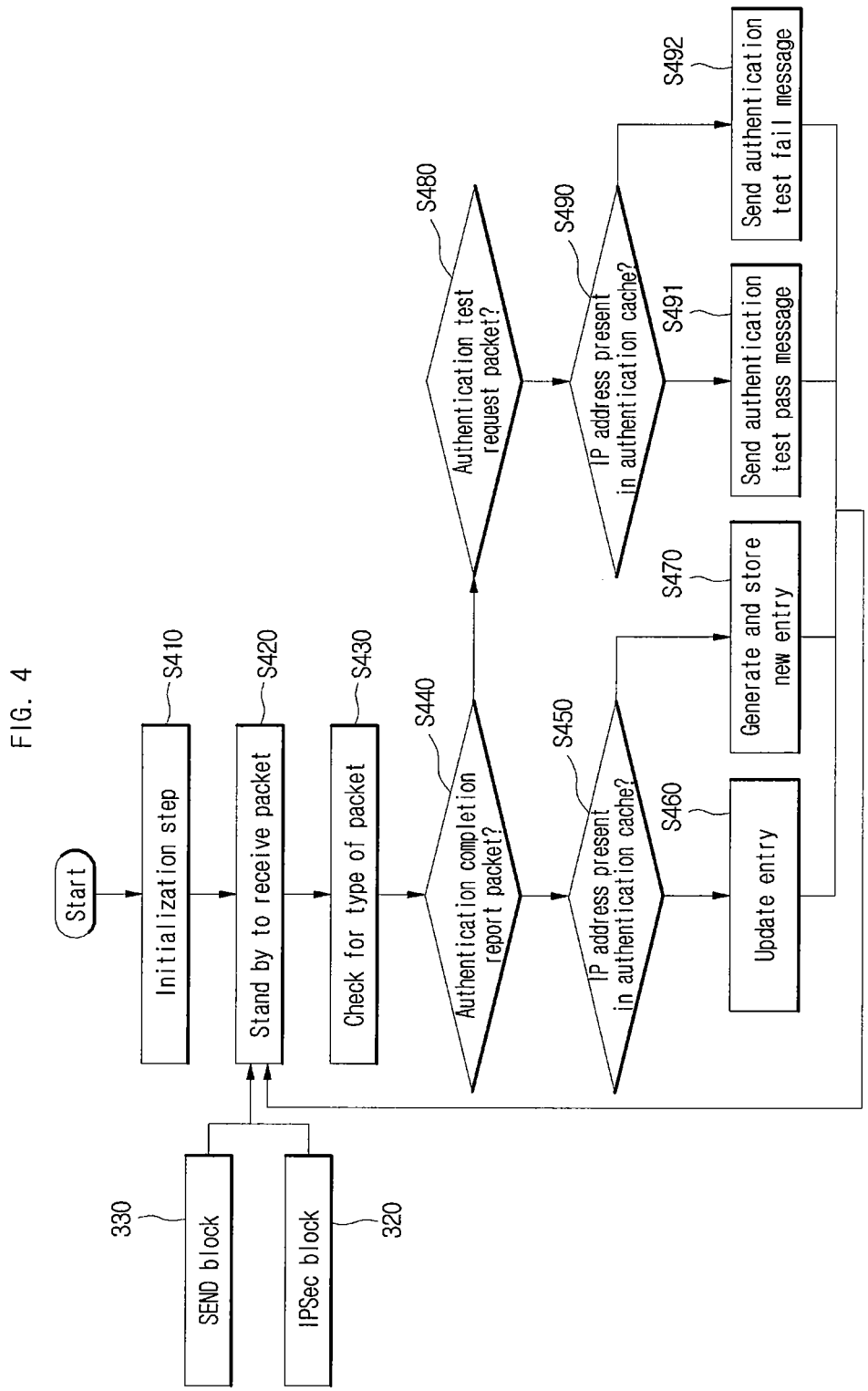
FIG. 4 shows a flowchart of an authentication cache management module in accordance with an embodiment of the present invention.

FIG. 4 is a process flow diagram of an authentication cache management module in accordance with an embodiment of the present invention.

Referring to FIG. 4, the authentication cache management module 342 operates as an individual DEMON type, generates the authentication cache 360 during an initialization step, which is represented by S410, and configures a communication channel for data exchange between the SEND block 330 and IPSec block 320.

In the step represented by S420, the authentication cache management module 342 stands by to receive a control packet from the outside, once the initialization step is completed. Here, the control packet received from the outside can include an authentication completion report packet, which includes IP address information of a host whose authentication is completed by the SEND block 330, and an authentication check request packet, which is received from the IPSec block 320 for an authentication check. The authentication check request packet can include the IP address to be tested.

In accordance with another embodiment of the present invention, it shall be noted that the authentication cache management module 342 can send/receive a particular control signal between the SEND block 330 and IPSec block 320, by using a communication method between processors using a predetermined paging function and a shared memory.

In case the control packet is received from the outside, the authentication cache management module 342 checks for the type of packet through header information of the received control packet, in step S430.

In case the authentication cache management module 342 receives an authentication completion report packet, including the IP address information of the host whose authentication is completed, from the SEND block 330 in S440, the presence of the IP address information in the authentication cache 360 is determined in step S450.

The SEND block 330 of the present invention handles a SEND process for an ND message, which is inputted/outputted to/from an NIC (network interface card). Here, the SEND process can include an authentication process, i.e. a user authentication process, for the opposite host.

If the authentication for the opposite host is successful, the SEND block 330 sends the IP address of the authenticated opposite host to the authentication cache management module 342 through the communication channel configured in the above initialization step (S410).

If there exists an entry including the received IP address information in the authentication cache 360 in the above step of S450, the authentication cache management module 342 updates the IP address included in the entry to the received IP address, in step S460.

If there does not exist an entry including the received IP address in the authentication cache 360 in the above step of S450, the authentication cache management module 342 generates a new entry including the received IP address and stores the new entry in the authentication cache, in step S470.

If, as a result of the step of S430, an authentication check request packet, including the IP address, is received from the IPSec module 321 in step S480, the authentication cache management module 342 determines whether the received IP address exists in the authentication cache, in S490.

If, as a result of the determination, the received IP address exists in the authentication cache 360, that is, if the user authentication of the IP address has been already completed by the SEND block 330, the authentication cache management module 342 sends an authentication check pass message to the IPSec module 321, in step S491.

If the received IP address does not exist in the authentication cache 360 in step S490, the authentication cache management module 342 sends an authentication check fail message to the IPSec module 321, in step S492.

After any one of the above steps of S460, S470, S491, and S492 is completed, the authentication cache management module 342 returns to the step of S420.

Once an authentication check fail packet is received, the IPSec module 321 attempts to authenticate the host, using the electronic signature and the public key. In other words, the host authentication module 322, which is in the IPSec block 320, carries out the user authentication, using the public key in accordance with a control signal (i.e. a control signal indicating authentication check failure) of the IPSec module 321.

Here, the user authentication using the public key can include a process of generating the P-SAD and P-SPD, in which the conventionally used security association database (SAD) and security policy database (SPD) are added with a field that can store the public key of the host.

The session management module 320 of the present invention maintains and manages a session, using the generated P-SAD 380 and P-SPD 390.

In a mobile IPv6 environment, the IP address can be frequently changed in accordance with the movement of the host, and accordingly, it is difficult to use the IP address as unique information for recognizing the opposite host.

Therefore, the IPSec block 320 of the present invention uses the public key, which can be the unique information on the user, to authenticate the user and manage the session, guaranteeing the mobility of the user while managing the session more safely.

Figure 5:
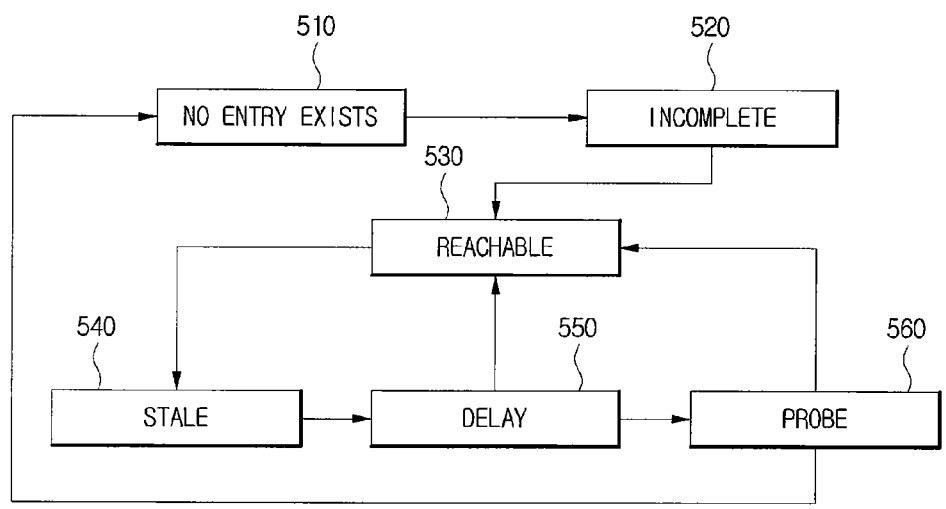
FIG. 5 shows a state transition diagram of a neighbor cache entry defined by IEEE RFC2461.

FIG. 5 is a state transition diagram of a neighbor cache entry defined by IEEE RFC2461.

Referring to FIG. 5, the neighbor cache entry state transition diagram can include the states of NO ENTRY EXISTS 510, INCOMPLETE 520, RECHEABLE 530, STALE 540, DELAY 550, and PROBE 560, as state information for distinguishing reachability to the neighbor node.

The NO ENTRY EXISTS 510 state indicates that there is no entry (i.e. authentication information) for a particular node in the authentication cache.

The INCOMPLETE 520 state indicates that an address resolution for the entry has been completed.

The REACHABLE 530 state indicates that a packet transfer route to the neighbor node is properly operating, and if a control signal indicating that the communication route to the neighbor node is normal within a predefined reachable time milliseconds-this control signal will be referred to as "Positive Confirm" hereinafter—the authentication cache management module 342 can make a transition of the entry to the REACHABLE 530 state.

The STALE 540 state is a transition state of a case that has not received a Positive Confirm until the end of reachable time milliseconds after the last Positive Confirm had been received. In the STATE 540 state, no operation is made until the packet is sent.

In case a control signal for updating a link-layer address stored in the authentication cache is received, the authentication cache management module 342 of the present invention can make transition of the state of the entry to the STALE 540 state.

That is, the STALE 540 state does not guarantee the reachability to the neighbor node.

The DELAY 550 state is a state in which, after the last Positive Confirm is received, no Positive Confirm has been received until the end of reachable time milliseconds and the packet is sent within a DELAY_FIRST_PROBE_TIME.

In case no reachability confirmation message is received within the DELAY_FIRST_PROBE_TIME, the authentication cache management module 342 sends a Neighbor Solicitation message and makes a transition of the state of the entry to the PROBE 560 state.

In the PROBE 560 state, the reachability confirmation process can be actively carried out by re-sending the Neighbor Solicitation message at re-sending intervals whenever the reachability confirmation message is received.

Figure 6:
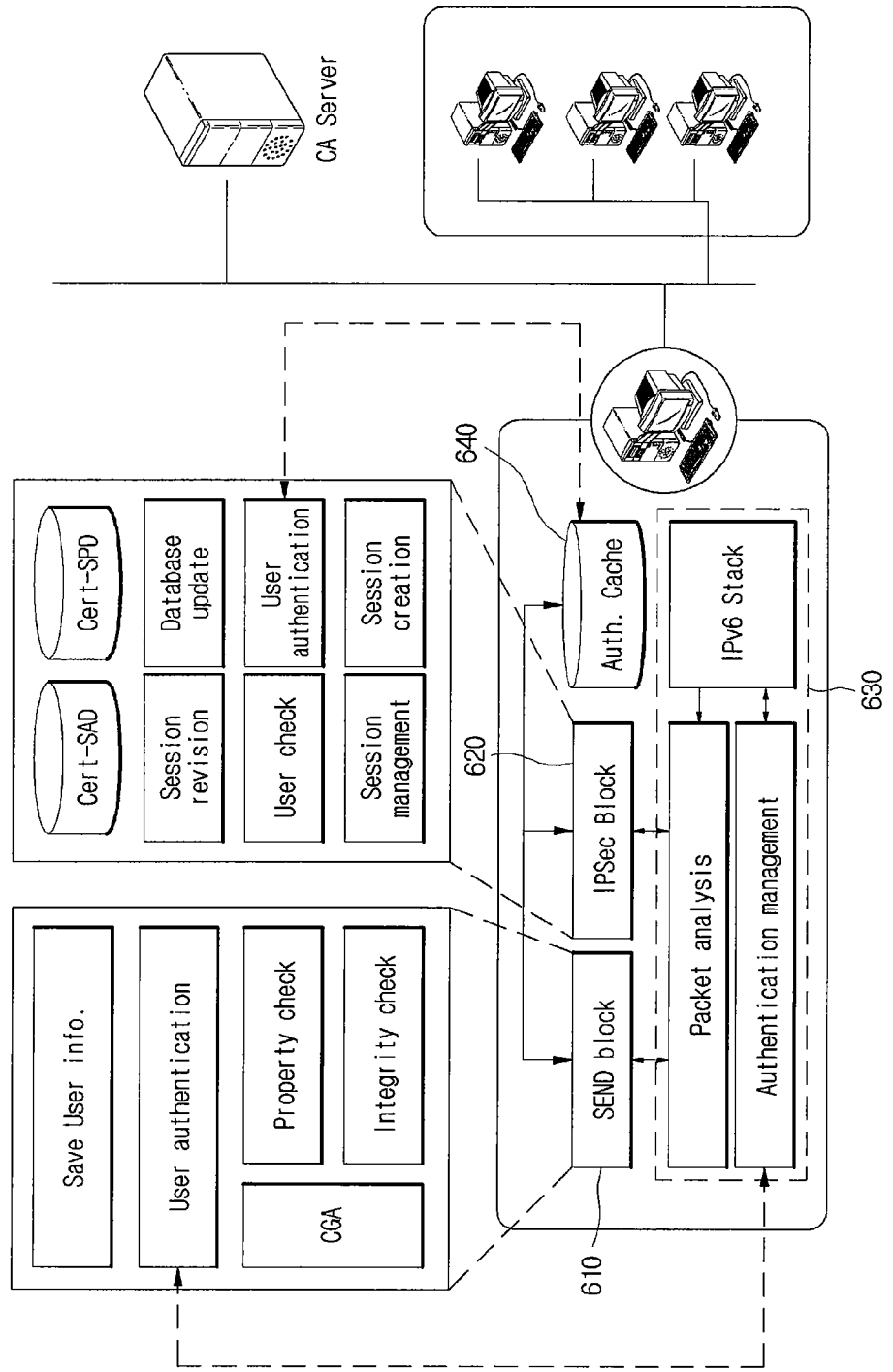
FIG. 6 shows a block diagram of a cooperation system of SEND and IPSec in accordance with an embodiment of the present invention.

FIG. 6 is a block diagram of a cooperation system of SEND and IPSec in accordance with an embodiment of the present invention, and Table 2 describes the function of each block of the cooperation system.

Referring to FIG. 6, the cooperation system in accordance with an embodiment of the present invention can generally include a SEND block 610, an IPSec block 620, a management block 630, and an authentication cache 640.

The SEND block 610, IPSec block 620, and authentication block 640 includes all of the functions described with respect to the SEND block 330, IPSec block 320, and authentication block 360 in FIGS. 3 to 5, and thus the pertinent description will be omitted herein.

Referring to FIG. 2, the SEND block 610 can carry out the functions of integrity check, property check, user authentication, and save user information.

The IPSec block 620 can carry out the function of session generation, session management, user authentication, user check, database update, and session revision.

The management block 630 can carry out the functions of packet analysis and authentication management.

Table 2 below describes the functions for each of the above blocks.

TABLE 2

Functions of each block of the cooperation system

| | Function | Description |
|---|---|---|
| END | Integrity check | Check for integrity of SEND packet information |
| | Property check | Check for address ownership for the host |
| | User authentication | Authenticate the user |
| | Save user information | Save the authentication information in the authentication cache |
| PSec | Session generation | Configure IPSec session |
| | Session management | Revise and maintain the session |
| | User authentication | Authenticate a new user |
| | User check | Check whether the user is legitimate for the session |
| | Database update | Generate the database |
| | Session revision | Revise the session information of the database |
| | Database | Save the session information |
| | Packet analysis | Analyze the SEND and IPSec packets |
| | Authentication management | Generate and manage public/private key |

Hereinafter, some examples of applying the cooperation method of SEND and IPSec in different network environments in accordance with the present invention will be described with reference to FIGS. 7 to 9.

Table 3 lists network environments to which the cooperation system of the present invention can be applied.

TABLE 3

Operational environments of the cooperation system

| Environment | | Cooperation feasibility |
|---|---|---|
| Same network (Scenario 1) | | ○ |
| Different network environments | IPSec tunnel mode (Scenario 2) | ○ |
| | IPSec send mode (Scenario 3) | X |

As shown in Table 3, there can be 3 different environments in which SEND and IPSec are used at the same time, but the cooperation is feasible in two environments only, namely, Scenario 1 and Scenario 2.

Figure 7:
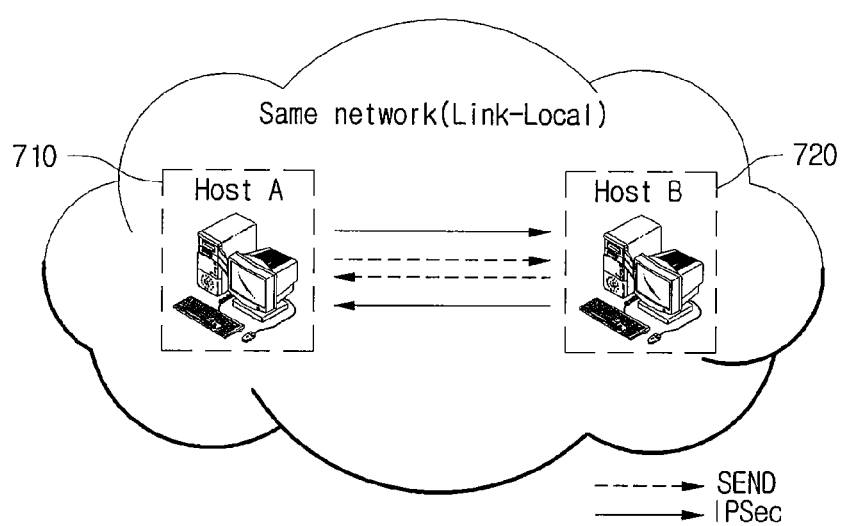
FIG. 7 shows a cooperation scenario in a same network environment in accordance with an embodiment of the present invention.

FIG. 7 illustrates a cooperation scenario in a same network environment in accordance with an embodiment of the present invention.

Scenario 1 illustrated in FIG. 7 is the most basic network environment. This is the network to which a first host belongs, in case the first host participates in the network.

The cooperation system in accordance with an embodiment of the present invention can carry out the integrity check, property check, and user authentication for two hosts (i.e. Host A 710 and Host B 720) though the SEND protocol at the first communication. If the authentication is successful, an IP address assigned to the host can be stored in the authentication cache 360.

Then, the cooperation system of the present invention can carry out the session generation, user authentication, and database generation steps during an IPSec security agreement process for the two hosts, providing the IPSec communication between the two hosts.

Particularly, in the cooperation system of the present invention, the opposite host can determine whether the authentication is completed, through the SEND process, depending on the presence of opposite host information (e.g. the IP address of the opposite host) in the authentication cache 360 during the user authentication.

The opposite host information is checked at every predetermined interval, and the cooperation system can delete the opposite host information from the authentication cache 360 if it is determined that the opposite host is no longer present in the network, based on the neighbor cache state transition diagram shown in FIG. 5.

Figure 8:
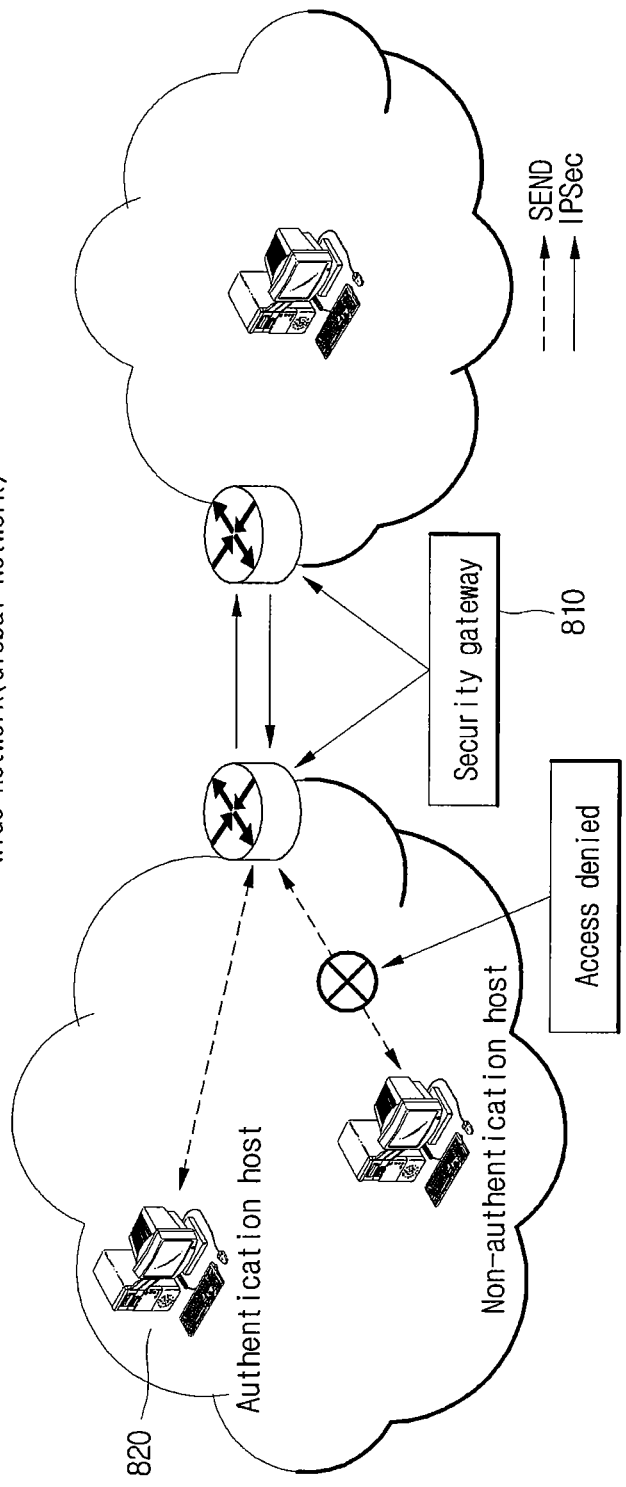
FIG. 8 illustrates the operation of a cooperation system using a security gateway in different network environments in accordance with an embodiment of the present invention.

FIG. 8 illustrates the operation of a cooperation system using a security gateway in two different network environments, in accordance with an embodiment of the present invention.

Referring to FIG. 8, security gateways 810 of the present invention are present in two different networks, and functions to work as a gateway to another network and provide secure communication between security gateways.

The security gateway 810 also performs authentication for the host belonging to its network, and controls to allow information of a normally authenticated host to pass the security gateway.

As shown in FIG. 8, communication between an authentication host 810 and the security gateway is performed through the SEND protocol, and communication between the security gateways 810 is performed through the IPSec protocol.

In the following description, the communication mode performed through the network structure shown in FIG. 8 will be referred to as an IPSec tunnel mode.

Such IPSec tunnel mode can even make another network as a target of attack if unauthenticated host participates in each network, the security and authentication management is imperative for the participating hosts.

In order for a host to join the network, router information is required. The router information is configured to be provided only if the host requests, and the router information are requested to use SEND.

In this process, the security gateway 810 performs user authentication for the host. Here, since the user authentication process is identical to the process described with respect to Scenario 1, the description will be omitted herein.

If the user authentication information is present in the authentication cache 360 because the user authentication of a host has been successful, the security gateway 810 can either send a packet received from the host to another host accessed to another network, or receive a packet that takes the IP address assigned to the host as the destination address from another network and send the packet to the host.

Figure 9:
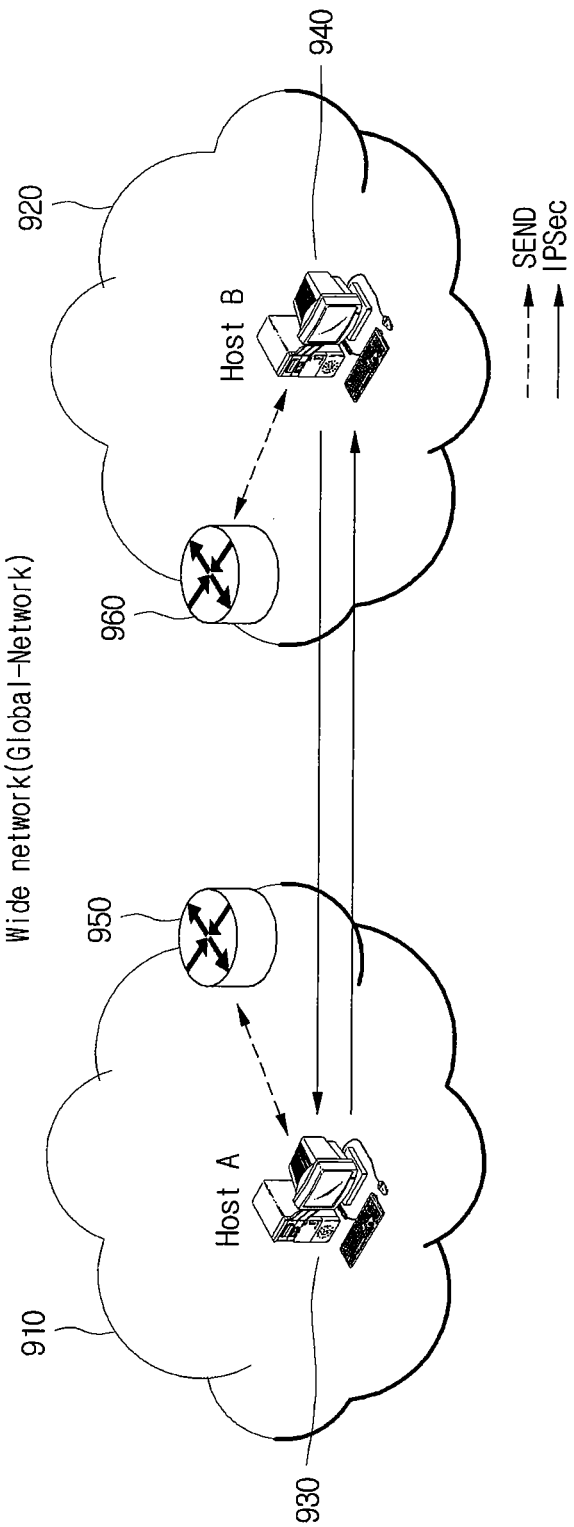
FIG. 9 illustrates a method of connecting secure communication between hosts belonging to different network environments in accordance with an embodiment of the present invention.

FIG. 9 shows how a secure communication is connected between hosts belonging to different network environments, in accordance with an embodiment of the present invention.

Referring to FIG. 9, Scenario 3 in accordance with an embodiment of the present invention assumes that a Host A 930, belonging to a first network 910, and a Host B 940, belonging to a second network 920, are carrying out secure communication in a wide network 900, which includes the first network 910 and the second network 920.

The first network 910 and the second network 920 include a first authentication server 950 and a second authentication server 960, respectively, which provide an authentication service for hosts accessed to the corresponding network.

The authentication server and host belonging to the same network perform the authentication process through SEND, and the user authentication information can not be shared with the other authentication server.

In Scenario 3, particularly, the Host A 930, which is authenticated by the first authentication server 950, communicates directly with the Host B 940, which is authenticated by the second authentication server 960.

As described above, since the SEND mechanism operates inside the same network only, the authentication information of a host belonging to a different network cannot be stored.

Therefore, in a network environment that cannot share the user authentication information between different networks, the cooperation method between SEND and IPSec of the present invention can be applied in the same network only.

In the IPv6 environment, however, the subnet can have the maximum size of $2^{64}$; the subnet in the IPv4 environment can have the maximum size of $2^{32}$. That is, a network using IPv6 can form a larger network than a network using IPv4.

Therefore, although the SEND and IPSec cooperation system of the present invention can be used in a same network only, the sheer size of the network can be quite useful.

In case the IP address assigned to the host is frequently changed to strengthen the security in a network using SEND, or the access network is changed due to the movement of the host, the IP address of the pertinent host can be changed.

The IPSec of the cooperation system in accordance with the present invention can maintain the session using a security key (e.g. public key). If the IP address assigned to a particular host is changed, the pertinent host ("first host") can send the existing session information and security key information to the opposite host ("second host") by using the newly assigned IP address.

The second host checks whether a session corresponding to a session identifier included in the received session information is already configured by searching the P-SAD 370.

If the session corresponding to the session identifier is present, the second host determines whether the received session information and security key information are identical to the pre-stored session information and security key information.

If the information is identical, the second host checks for the user by using the public key and updates the IP address of the first host stored in the P-SAD 370 to the newly assigned IP address. Then, the first host and the second host perform IPSec secure communication by using the updated P-SAD 370.

Although certain embodiments have been described, it shall be evident to anyone who is skilled in the art to which the present invention pertains that there can be a variety of permutations and modifications within the technical ideas and scope of the invention, which shall only be defined by the appended claims.

What is claimed is:

1. A method enabling cooperation between a SEND processing block and an IPSec processing block in an apparatus comprising a processor configured to execute an authentication cache management module, the method comprising:

receiving an authentication completion report message including an IP address of a host whose authentication is completed by the SEND processing block;

generating new authentication information corresponding to the same host and storing the new authentication information in a temporary storage area, when authentication information for the host is not present in the temporary storage area, wherein the authentication information includes the IP address of the host; and when an authentication check request message including an IP address is received from the IPSec processing block, checking, by referring to the temporary storage area, whether the IP address included in the authentication check request message is the same as the IP address of the host whose authentication was previously completed by the SEND processing block, and sending the result of checking to the IPSec processing block, wherein when the IP address included in the authentication check request message is present in the temporary storage area, authentication of the host corresponding to the IP address included in the authentication check request message is determined to be completed, and an authentication check pass message is sent to the IPSec processing block, and wherein both the SEND processing block and the IPSec processing block are executed by the processor.

2. The method of claim 1, wherein, when the IPSec processing block received the authentication check pass message, no other IPSec processing block authentication procedure is performed for the pertinent host.

3. The method of claim 1, wherein, when the IP address included in the authentication check request message is not present in the temporary storage area, an authentication check fail message, indicating that no authentication information for a host corresponding to the second address is present, is sent to the IPSec processing block.

4. The method of claim 3, wherein, when the IPSec processing block receives the authentication check fail message, user authentication for the host corresponding to the second address is attempted by using an electronic signature and a public key, which are pre-assigned in accordance with the pertinent host.

5. The method of claim 1, further comprising, when authentication information corresponding to the host is already present in the temporary storage area when the authentication completion report message is received, updating an existing IP address included in the authentication information to the IP address of the host.

6. The method of claim 5, wherein existing session information and a public key are sent to an opposite host, which is forming a session with the host, by using the updated IP address.

7. The method of claim 6, wherein, when information that is identical to the existing session information and public key is present in a public key security agreement database, the opposite host changes the existing IP address corresponding to the pertinent session to the updated IP address.

8. A non-transitory recorded medium tangibly embodying a program of instructions executable by a computer to enable a cooperation system between a SEND processing block and an IPSec processing block comprising the steps of:

receiving an authentication completion report message including an IP address of a host whose authentication is completed by the SEND processing block;

generating new authentication information corresponding to the same host and storing the new authentication information in a temporary storage area, when authentication information for the host is not present in the temporary storage area, wherein the authentication information includes the IP address of the host; and when an authentication check request message including an IP address is received from the IPSec processing block, checking, by referring to the temporary storage area, whether the IP address included in the authentication check request message is the same as the IP address of the host whose authentication was previously completed by the SEND processing block and sending the result of checking to the IPSec processing block, wherein, when the IP address included in an authentication check request message is present in the temporary storage area, authentication of the host corresponding to the IP address included in an the authentication check request message is determined to be completed, and an authentication check pass message is sent to the IPSec processing block, and wherein both the SEND processing block and the IPSec processing block are implemented on a computing device.

9. A system enabling cooperation between a SEND processing block and an IPSec processing block, the system comprising:

a processor;

an authentication cache, temporarily storing authentication information of a host whose authentication is completed;

a SEND processing block, configured to perform user authentication for an opposite host and send an IP address of the authenticated opposite host to an authentication cache management module;

an authentication cache management module, configured to, when an IP address of an authenticated host is received from the SEND processing block, store the IP address in the authentication cache or check for authentication of the IP address by referring to the authentication cache in accordance with an authentication check request from an IPSec processing block; and an IPSec processing block, configured to send an authentication check request message including an IP address of a host to be authenticated to the authentication cache management module and determine whether the host associated with the authentication check request message is authenticated in accordance with a result of the authentication check received from the authentication cache management module, wherein the authentication cache management module is further configured to send an authentication check pass message, indicating that user authentication of the host associated with the authentication check request message was previously completed by the SEND processing block, to the IPSec processing block, when, upon referring to the authentication cache, the authentication cache management module determines that the IP address for which the authentication check is requested is the same as the IP address of the previously authenticated host, and wherein both the SEND processing block and the IPSec processing block are executed by the processor.

10. The system of claim 9, further comprising a packet filtering block, configured to analyze an extension header of a received traffic, send the traffic to a block that will receive the traffic, and filter a ND (Neighbor Discovery) message.

11. The system of claim 9, wherein the authentication cache management module is further configured to send an authentication check fail message, indicating that no authentication information for the IP address is present, to the IPSec processing block, when the IP address for which the authentication check is requested is not present in the authentication cache.

12. The system of claim 11, wherein, when the IPSec processing block receives the authentication check pass message, user authentication for the IP address for which the authentication check is requested is not performed.

* * * * *